(12) United States Patent
Matsuzawa

(10) Patent No.: US 6,763,660 B2
(45) Date of Patent: Jul. 20, 2004

(54) EXHAUST STRUCTURE IN ENGINE FOR AUTOMOBILE

(75) Inventor: Hideo Matsuzawa, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/125,039

(22) Filed: Apr. 18, 2002

(65) Prior Publication Data

US 2002/0152748 A1 Oct. 24, 2002

(30) Foreign Application Priority Data

Apr. 19, 2001 (JP) ........................................ 2001-121541

(51) Int. Cl.[7] ................................................ F01N 7/10
(52) U.S. Cl. .......................................... 60/323; 60/324
(58) Field of Search .......................... 60/312, 313, 322, 60/323, 324

(56) References Cited

U.S. PATENT DOCUMENTS

| | | | | |
|---|---|---|---|---|
| 4,420,933 A | * | 12/1983 | Kajitani et al. | ............... 60/302 |
| 5,144,800 A | * | 9/1992 | Shioya et al. | ................. 60/323 |
| 5,195,607 A | * | 3/1993 | Shimada et al. | ............ 180/296 |
| 5,265,420 A | * | 11/1993 | Rutschmann | ................ 60/302 |
| 5,398,504 A | * | 3/1995 | Hirota et al. | ................. 60/302 |
| 6,003,310 A | * | 12/1999 | Mayer et al. | ................. 60/287 |
| 6,082,103 A | * | 7/2000 | Sugiura et al. | ............... 60/323 |
| 6,298,935 B1 | * | 10/2001 | Steenackers et al. | ....... 180/89.2 |

* cited by examiner

Primary Examiner—Thomas Denion
Assistant Examiner—Diem Tran
(74) Attorney, Agent, or Firm—Lahive & Cockfield, LLP; Anthony A. Laurentano

(57) ABSTRACT

A connection of the exhaust emission control device, to which a collecting portion of an exhaust manifold extending rearwards and downwards from a rear face of a cylinder block is connected, is eccentric toward an engine block by a distance with respect to an axis of a cylindrical main casing. Therefore, the exhaust manifold can be located as close as possible to a rear face of the engine block to ensure that travel wind is difficult to collide with the exhaust manifold, thereby preventing a drop in temperature of an exhaust gas to early raise the temperature of the exhaust emission control device. Moreover, since the exhaust manifold is disposed closer to the rear face of the engine block, a collision stroke permitting the retraction of the engine upon frontal collision can be expanded.

9 Claims, 5 Drawing Sheets

EXHAUST STRUCTURE IN ENGINE FOR AUTOMOBILE

BACKGROUND OF THE INVENTION

1. Technical Field of the Invention

The present invention relates to an exhaust structure in an engine for an automobile, the engine comprising a cylinder head which includes exhaust ports in its rear face, an engine block, and a crankshaft disposed in a lateral direction of a vehicle body; the exhaust structure comprising an exhaust manifold which is connected to the exhaust ports and which includes a collecting portion, and a substantially cylindrical exhaust emission control device which is disposed in the rear of the engine block and which includes a connection at its upper end; the collecting portion is connected to the connection.

2. Description of the Related Art

In a general automobile of a front-engine and front-drive type, an engine is laterally disposed so that a crankshaft extends along a lateral direction of a vehicle body. An intake manifold is connected to a rear face of a cylinder head, and an exhaust manifold is connected to a front face of the cylinder head. On the other hand, there is another type of automobile in which an intake manifold is connected to a front face of a cylinder head of a laterally-disposed engine, and an exhaust manifold is connected to a rear face of the cylinder head. In this type, a so-called straight-down-type exhaust emission control device is connected to a collecting portion of the exhaust manifold extending rearwards and downwards from the rear face of the cylinder head. The exhaust emission control device is formed into a substantially cylindrical shape, and the collecting portion of the exhaust manifold is conventionally connected to a connection formed at a central portion of an upper face of the exhaust emission control device.

Immediately after starting of the engine, the exhaust emission control device is in an inactive state and for this reason, it is necessary to heat the exhaust emission control device by heat of an exhaust gas to early activate the exhaust emission control device. For this purpose, it is desirable that travel wind is prevented as much as possible from acting on the exhaust manifold to maintain the temperature of the exhaust gas flowing into the exhaust emission control device at a high level. However, the diameter of the exhaust emission control device is considerably large, and if the exhaust manifold is connected to the connection formed at the central portion of the upper face of the exhaust emission control device, the exhaust manifold is parted from the rear face of the engine block, and travel wind is thus liable to act on the exhaust manifold. As a result, there is a possibility that the early activation of the exhaust emission control device is impeded.

In addition, it is desirable that a collision stroke permitting the retraction of the engine upon the frontal collision of the automobile is set as large as possible. However, if the exhaust manifold leading to the exhaust emission control device is parted rearwards from the rear face of the engine block, the following problem is encountered: the exhaust manifold having a high rigidity interferes with other members such as a steering gear box and the like, resulting in a reduction in the collision stroke.

The present invention has been accomplished with the above circumstance in view, and it is an object of the present invention to ensure that, in a rear-wall-discharging-type engine including a straight-down-type exhaust emission control device, an exhaust manifold connecting exhaust ports to the exhaust emission control device is located as close as possible to a rear face of an engine block.

SUMMARY OF THE INVENTION

To achieve the above object, according to a first feature of the present invention, there is provided an exhaust structure in an engine for an automobile, the engine comprising a cylinder head which includes exhaust ports in its rear face; an engine block; and a crankshaft disposed in a lateral direction of a vehicle body. The exhaust structure comprises an exhaust manifold which is connected to the exhaust ports and which includes a collecting portion; and a substantially cylindrical exhaust emission control device which is disposed in the rear of the engine block and which includes a connection at its upper end. The collecting portion is connected to the connection. The position of the connection of the exhaust emission control device is eccentric toward the engine block with respect to an axis of the exhaust emission control device.

With the above arrangement, the position of the connection of the exhaust emission control device is eccentric toward the engine block with respect to the axis of the exhaust emission control device. Therefore, the exhaust manifold can be disposed as close as possible to the rear face of the engine block, and thus it is possible to prevent travel wind from colliding with the exhaust manifold during cold operation of the engine immediately after starting of the engine to prevent a drop in temperature of an exhaust gas, thereby enabling the early raising of the temperature of the exhaust emission control device to inhibit the discharging of an emission. Moreover, since the exhaust manifold is disposed near the rear face of the engine block, it is possible to expand the collision stroke permitting the retraction of the engine upon the frontal collision to absorb a shock.

According to a second feature of the present invention, in addition to the arrangement of the first feature, there is provided an exhaust structure in an engine for an automobile in which the collecting portion of the exhaust manifold has a shape elongated in a direction of the crankshaft.

With the above arrangement, the collecting portion of the exhaust manifold has the shape elongated in the direction of the crankshaft. Therefore, all exhaust pipes constituting the exhaust manifold can be located still closer to the engine block in the vicinity of the collecting portion, thereby further enhancing an effect of early raising the temperature of the exhaust emission control device and an effect of expanding the collision stroke.

DETAILED DESCRIPTION OF THE PREFERRED EMBODIMENT

The present invention will now be described by way of an embodiment with reference to the accompanying drawings.

Figure 1:
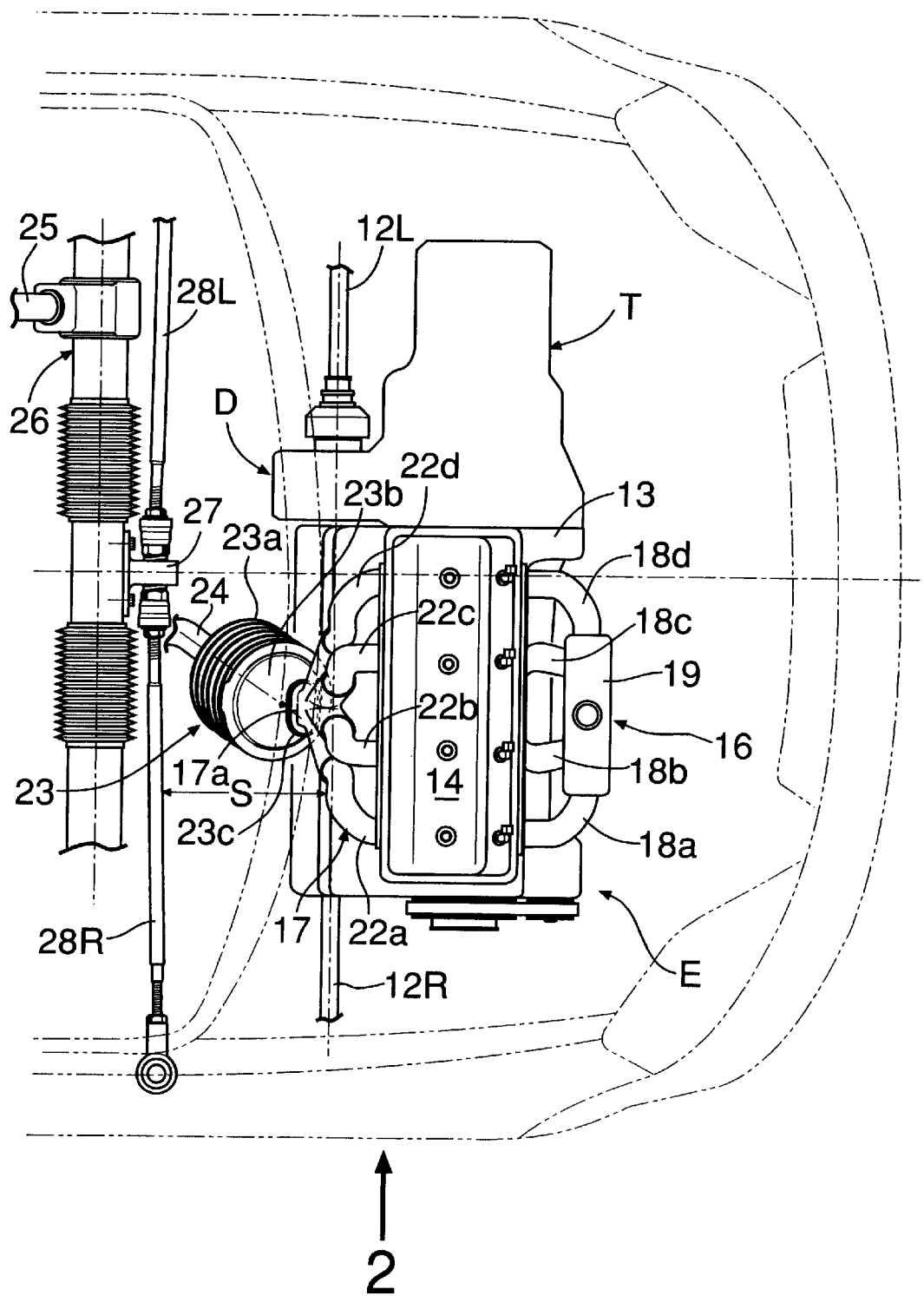
FIG. 1 is a plan view of en engine room in an automobile.
Figure 2:
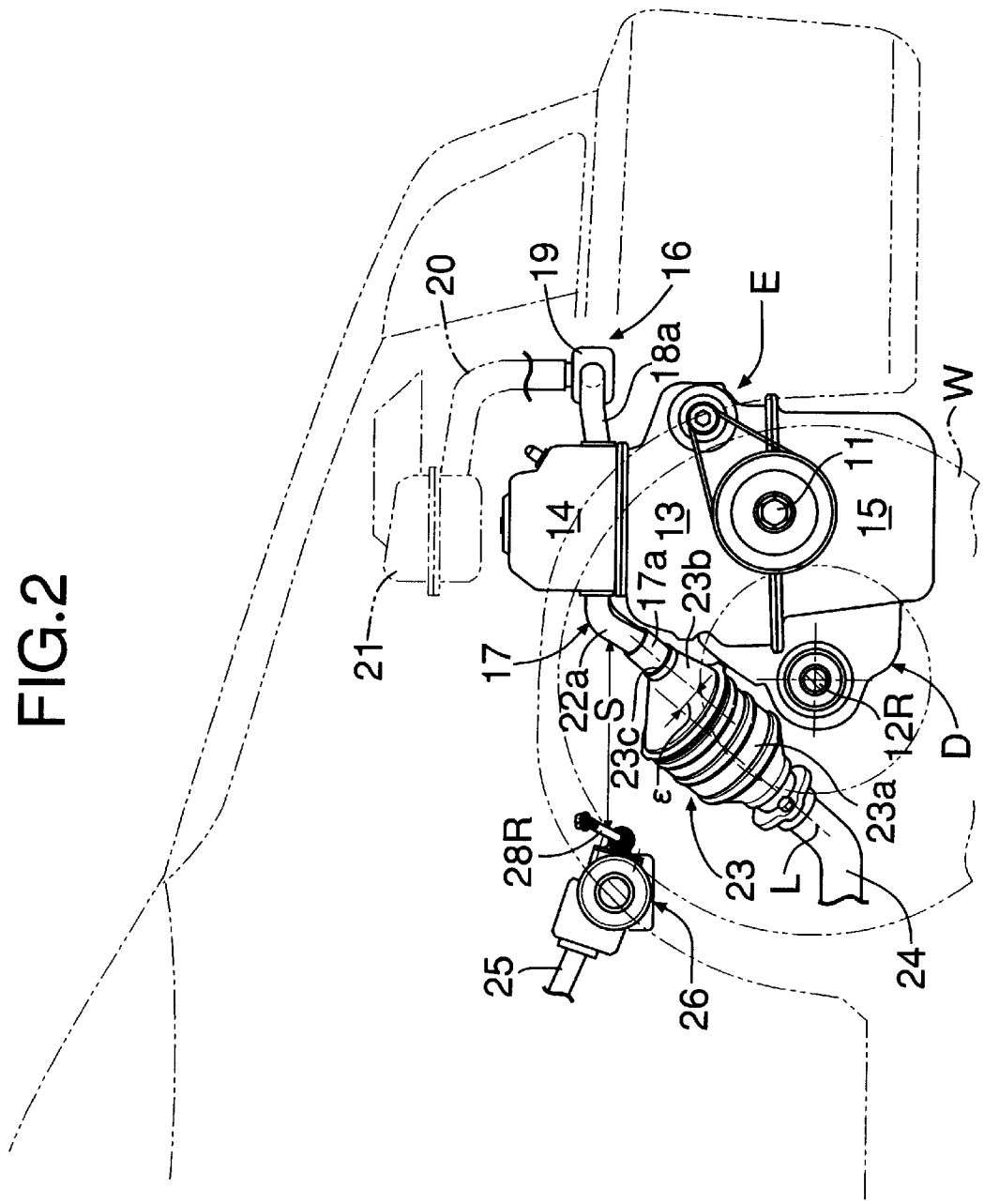
FIG. 2 is a view taken in a direction of an arrow 2 in FIG. 1.

As shown in FIGS. 1 and 2, an in-line 4-cylinder engine E is mounted laterally (that is, a crankshaft 11 is disposed in a lateral direction of a vehicle body) in an engine room in an automobile of a front-engine and front-drive type. A transmission T is coupled to a left side of the engine E, and drive shafts 12L and 12R leading to front wheels W, W extends leftward and rightward, respectively, from a differential gear D disposed in the rear of the transmission T. The engine E includes an engine block 13 including a cylinder block and a crankcase formed integrally with each other, a cylinder head 14 coupled to an upper face of the engine block 13, and an oil pan coupled to a lower face of the engine block 13. An intake manifold 16 is coupled to a front face of the cylinder head 14, and an exhaust manifold 17 is coupled to a rear face of the cylinder head 14.

The intake manifold 16 including four intake passages 18a, 18b, 18c and 18d and a surge tank 19 formed integrally with one another is connected to an air cleaner 21 through an intake pipe 20. The exhaust manifold 17 including four exhaust passages 22a, 22b, 22c and 22d formed integrally with one another is bent downwards from a rear face of the cylinder head 14; extends rearwards and downwards along a rear face of the engine block 13; and is connected to an upper face of a substantially cylindrical exhaust emission control device 23 disposed in the rear of the engine block 13. An exhaust pipe 24 connected to a lower face of the exhaust emission control device 23 extends rearwards of the vehicle body.

A steering gear box 26 is disposed laterally and connected to a lower end of a steering shaft 25, and has a laterally movable output member 27 connected to left and right front wheels W, W through tie rods 28L and 28R.

Figure 3:
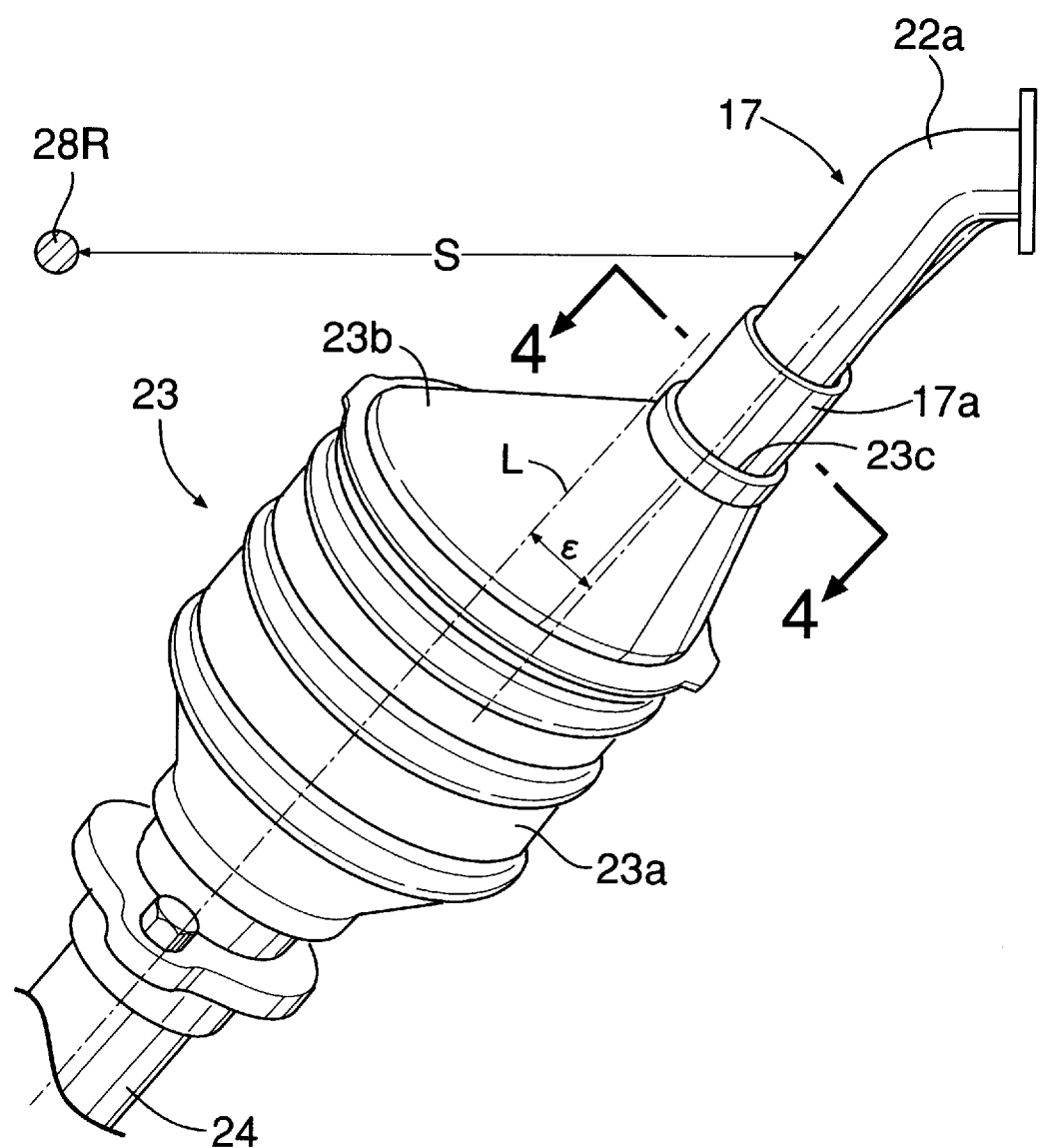
FIG. 3 is an enlarged view of an essential portion of FIG. 2.
Figure 4:
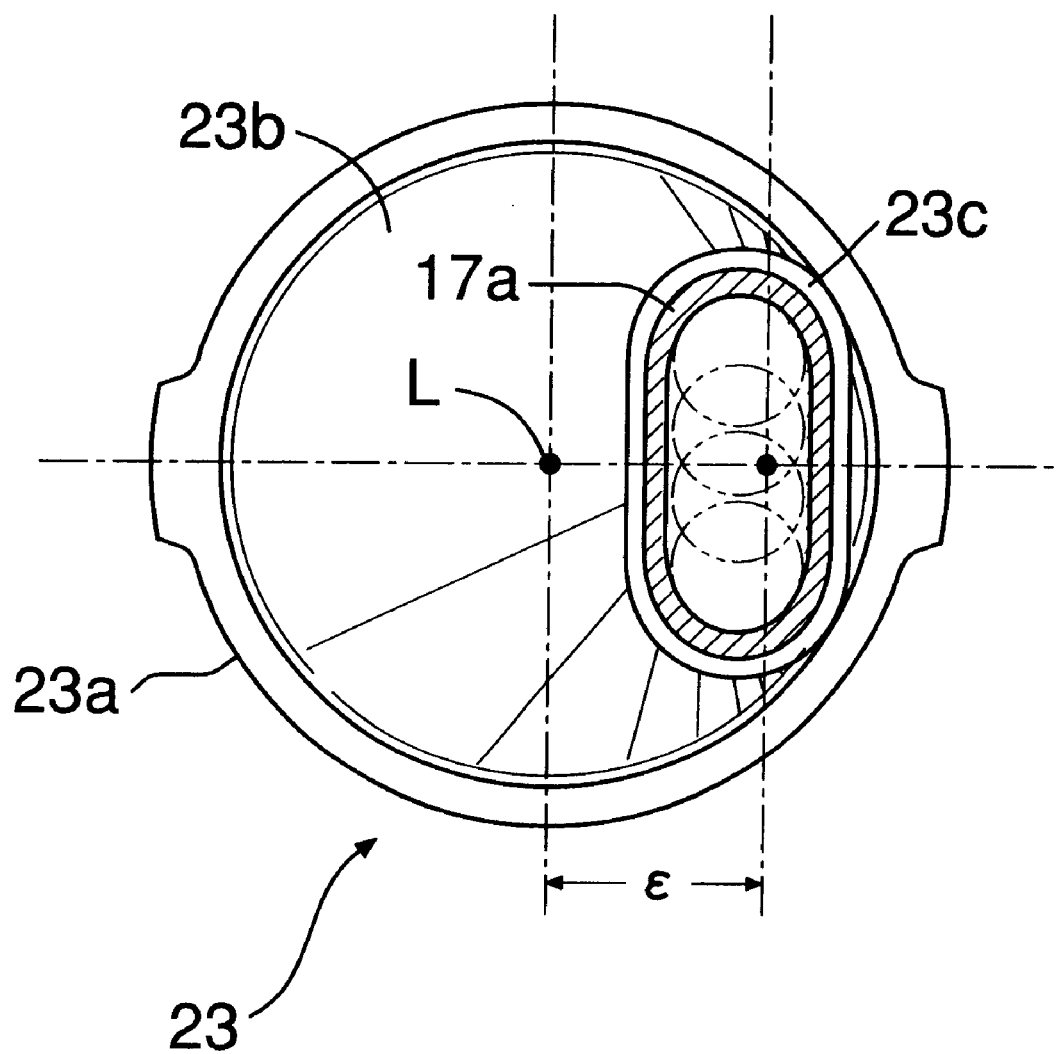
FIG. 4 is a sectional view taken along a line 4—4 in FIG. 3.

As can be seen from referring also to FIGS. 3 and 4, the exhaust emission control device 23 includes an obliquely conical end casing 23b on an upper face of a cylindrical main casing 23a. A collecting portion 17a of the exhaust manifold 17 for the four exhaust passages 22a, 22b, 22c and 22d is coupled to a connection 23c at an upper end of the end casing 23b. As a result of the formation of the end casing 23b of the exhaust emission control device 23 into the obliquely conical shape, the position of the connection 23c, to which the collecting portion 17a of the exhaust manifold 17 is connected, is offset by a distance ε toward the engine block 13 with respect to an axis L of the exhaust emission control device 23.

Thus, the exhaust manifold 17 can be located in more proximity to the rear face of the engine block 13, so that travel wind is difficult to collide with the exhaust manifold 17 during cold operation of the engine E immediately after the starting of the engine E. Therefore, it is possible to prevent a drop in temperature of an exhaust gas to enable the early raising of the temperature of the exhaust emission control device 23, thereby inhibiting the discharging of an emission from the engine E. Moreover, since the exhaust manifold 17 is located in proximity to the rear face of the engine block 13, a collision stroke S permitting the engine E to be retracted upon frontal collision of the automobile is expanded, whereby a shock-absorbing effect can be enhanced.

Figure 5:
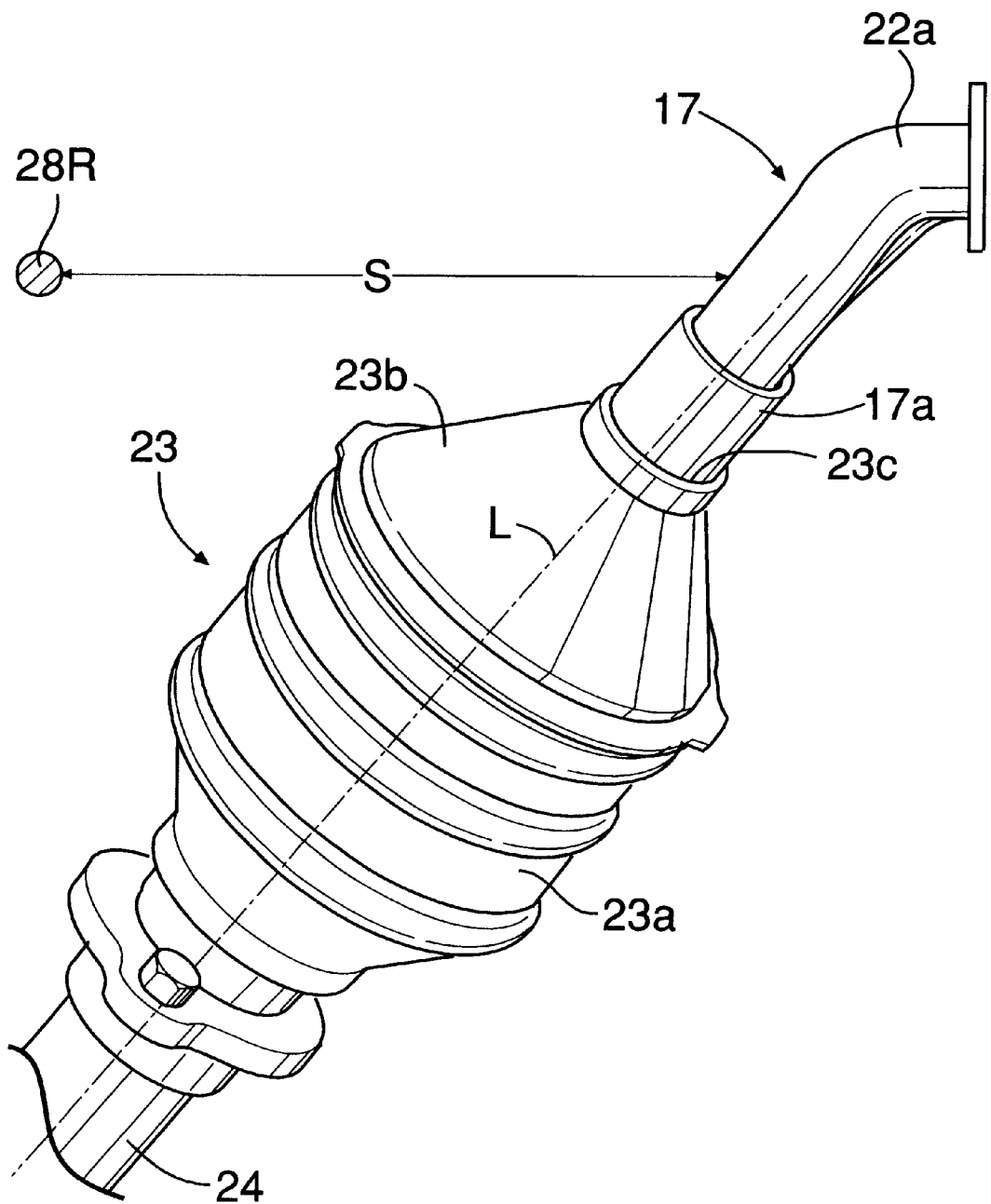
FIG. 5 is a view similar to FIG. 3 but showing the prior art.

In contrast, in a conventional exhaust emission control device 23 shown in FIG. 5, a connection 23c is provided at an upper end of a vertically conical end casing 12b coupled to an upper face of a cylindrical main casing 23a. Therefore, a collecting portion 17a of an exhaust manifold 17 is not eccentric with respect to an axis L of the main casing 23a and is spaced apart from an engine block 13 by the above-described distance ε (see FIGS. 3 and 4). As a result, the effect of early raising the temperature of the exhaust emission control device 23 and the effect of expanding the collision stroke S are detracted in this conventional structure.

In addition, as shown in FIG. 4, each of the connection 23c of the exhaust emission control device 23 and the collecting portion 17a of the exhaust manifold 17 connected to the connection 23c is formed into a shape elongated in a direction of the crankshaft 11. Therefore, the four exhaust pipes 22a, 22b, 22c and 22d of the exhaust manifold 17 can be located uniformly and in the maximum proximity to the engine block 13, thereby further enhancing the effect of early raising the temperature of the exhaust emission control device 23 and the effect of expanding the collision stroke.

Although the embodiment of the present invention has been described in detail, it will be understood that various modifications in design may be made without departing from the subject matter of the present invention.

For example, the in-line 4-cylinder engine has been illustrated in the embodiment, but the present invention is also applicable to a V-type multi-cylinder engine.

As described above, the position of the connection of the exhaust emission control device is eccentric toward the engine block with respect to the axis of the exhaust emission control device. Therefore, the exhaust manifold can be disposed as close as possible to the rear face of the engine block, and thus it is possible to prevent travel wind from colliding with the exhaust manifold during cold operation of the engine immediately after starting of the engine to prevent a drop in temperature of an exhaust gas, thereby enabling the early raising of the temperature of the exhaust emission control device to inhibit the discharging of an emission. Moreover, it is possible to expand the collision stroke permitting the retraction of the engine upon frontal collision to absorb a shock.

Furthermore, the collecting portion of the exhaust manifold has the shape elongated in the direction of the crankshaft. Therefore, all the exhaust pipes constituting the exhaust manifold can be located still closer to the engine block in the vicinity of the collecting portion, thereby further enhancing an effect of early raising the temperature of the exhaust emission control device and an effect of expanding the collision stroke.

What is claimed is:

1. An exhaust structure in an engine for an automobile, the engine comprising a cylinder head which includes exhaust ports in its rear face, an engine block, and a crankshaft disposed in a lateral direction of a vehicle body;

the exhaust structure comprising an exhaust manifold which is connected to the exhaust ports and which includes a collecting portion, and a substantially cylindrical exhaust emission control device which is disposed in the rear of the engine block and which includes a connection at its upper end;

the collecting portion being connected to the connection;

wherein the position of the connection of the exhaust emission control device is eccentric toward the engine block with respect to an axis of the exhaust emission control device.

2. An exhaust structure in an engine for an automobile according to claim 1, wherein the collecting portion of the exhaust manifold has a shape elongated in a direction of the crankshaft.

3. An exhaust structure in an engine for an automobile according to claim 1, wherein the substantially cylindrical exhaust emission control device comprises an end casing having an oblique conical shape to offset the connection at an end portion of the substantially cylindrical exhaust emission control device relative to the axis of the substantially cylindrical exhaust emission control device.

4. An exhaust structure in an engine for an automobile according to claim 1, wherein the connection of the exhaust structure is adapted to expand a collision stroke distance S as measured between the exhaust manifold and a tie rod of the automobile to accommodate retraction of the engine upon a frontal collision of the automobile.

5. An exhaust structure in an engine for an automobile according to claim 1, wherein the position of the connection of the exhaust emission control device is offset a distance toward the engine block with respect to the axis of the exhaust emission control device.

6. An exhaust structure in an engine for an automobile, the engine comprising a cylinder head which includes exhaust ports in its rear face, an engine block, and a crankshaft disposed in a lateral direction of a vehicle body;

the exhaust structure comprising an exhaust manifold which is connected to the exhaust ports and which includes a collecting portion, and a substantially cylindrical exhaust emission control device which is disposed in the rear of the engine block and which includes a connection at its upper end;

the collecting portion being connected to the connection;

wherein the axis of the collecting portion is offset toward the engine block relative to the axis of the exhaust emission control device and parallel to the axis of the exhaust emission control device.

7. An exhaust structure in an engine for an automobile according to claim 6, wherein the collecting portion of the exhaust manifold has a shape elongated in a direction of the crankshaft.

8. An exhaust structure in an engine for an automobile according to claim 6, wherein the substantially cylindrical exhaust emission control device comprises an end casing having an oblique conical shape to offset the connection at an end portion of the substantially cylindrical exhaust emission control device relative to the axis of the substantially cylindrical exhaust emission control device.

9. An exhaust structure in an engine for an automobile according to claim 6, wherein the connection of the exhaust structure is adapted to expand a collision stroke distance S as measured between the exhaust manifold and a tie rod of the automobile to accommodate retraction of the engine upon a frontal collision of the automobile.

* * * * *